(12) United States Patent
Kobayashi (10) Patent No.: US 9,083,832 B2
(45) Date of Patent: *Jul. 14, 2015

(54) IMAGE READING DEVICE AND METHOD OF MANUFACTURING HOUSING

(71) Applicant: Seiko Epson Corporation, Tokyo (JP)

(72) Inventor: Hidekazu Kobayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/852,245

(22) Filed: Mar. 28, 2013

(65) Prior Publication Data

US 2013/0265618 A1 Oct. 10, 2013

(30) Foreign Application Priority Data

Apr. 5, 2012 (JP) .................................. 2012-086228

(51) Int. Cl.
*H04N 1/04* (2006.01)
*H04N 1/00* (2006.01)
*B29C 39/02* (2006.01)
*B29C 45/26* (2006.01)
*H04N 1/031* (2006.01)
*B29L 11/00* (2006.01)

(52) U.S. Cl.
CPC ............ *H04N 1/00557* (2013.01); *B29C 39/02* (2013.01); *B29C 45/2628* (2013.01); *H04N 1/0318* (2013.01); *B29L 2011/0075* (2013.01); *H04N 2201/02487* (2013.01); *H04N 2201/03125* (2013.01)

(58) Field of Classification Search
CPC . H04N 1/193; H04N 3/1581; H04N 1/40056; H04N 1/031; H04N 1/03; H04N 2201/03138; H04N 1/02815; H04N 2201/02831; H04N 1/028; H04N 2201/02284; H04N 1/486; H04N 1/482; H04N 9/045; H04N 1/484; H04N 3/1562; H04N 1/00002; H04L 27/14665
USPC ......... 358/475, 482, 483, 484, 512–514, 509; 250/208.1, 234–236, 239, 216
See application file for complete search history.

(56) References Cited

U.S. PATENT DOCUMENTS

| 6,184,513 | B1 * | 2/2001 | Sawada ...................... 250/208.1 |
| 6,469,808 | B1 | 10/2002 | Onishi et al. |
| 7,209,268 | B2 * | 4/2007 | Ikeda ............................. 358/475 |
| 7,995,252 | B2 | 8/2011 | Okamoto et al. |
| 8,520,270 | B2 * | 8/2013 | Sawada et al. ................ 358/474 |
| 8,798,500 | B2 | 8/2014 | Shinkawa |
| 8,908,239 | B2 * | 12/2014 | Kobayashi .................... 358/475 |
| 2009/0057541 | A1 * | 3/2009 | Shoji et al. ................ 250/227.11 |
| 2013/0265619 | A1 * | 10/2013 | Kobayashi .................... 358/475 |
| 2013/0342912 | A1 * | 12/2013 | Kobayashi .................... 359/619 |

FOREIGN PATENT DOCUMENTS

JP 4145271 B2 6/2008

\* cited by examiner

*Primary Examiner* — Cheukfan Lee (57) ABSTRACT

A light guide inserted into an inclined groove is disposed so as to partially overlap with a lens unit that is fitted into a concave groove disposed parallel to the inclined groove when seen in a plan view, to regulate the separation of the lens unit from the concave groove and hold the lens unit in an insertion state by the light guide. Therefore, a fixing unit such as an adhesive agent is not required in fixedly disposing the light guide and the lens unit at a predetermined position of a frame, and a CIS module is assembled without using an adhesive agent, thereby allowing the CIS module that is easily disassembled when being discarded and that improves recycling efficiency to be provided.

17 Claims, 9 Drawing Sheets

IMAGE READING DEVICE AND METHOD OF MANUFACTURING HOUSING

CROSS REFERENCE TO RELATED APPLICATION

The entire disclosure of Japanese Patent Application No. 2012-086228, filed Apr. 5, 2012 is expressly incorporated by reference herein.

BACKGROUND

1. Technical Field

The present invention relates to an image reading device including an image forming optical device that forms an erect equal-magnification image by forming an image of reflected light from an object to be read.

2. Related Art

In the related art, a contact image sensor module (hereinafter, simply referred to as "CIS module") is used as an image reading device in image scanners, facsimiles, copy machines, financial terminal devices, and the like. The CIS module includes an illumination unit that illuminates an object to be read, an image forming optical device that forms an erect equal-magnification image of the object to be read, and a sensor that reads the erect equal-magnification image formed by the image forming optical device. In the CIS module, reflected light from the object illuminated by the illumination unit is condensed by the image forming optical device, and thus the erect equal-magnification image is formed on the sensor. For example, in an image reading device disclosed in Japanese Patent No. 4,145,271 (paragraphs 0018 to 0024, FIG. 1, and the like), rod-shaped light guide bodies formed of a transparent member such as an acryl resin are accommodated in a case and are fixedly disposed respectively in concave portions that are disposed on the right and left sides of an upper surface of a housing, and a lens array (image forming optical device) is fixedly disposed in a through hole provided between the light guide bodies of the housing.

Incidentally, in the related art, since the light guide body and the image forming optical device are fixed to a predetermined position of a holding unit such as a housing an adhesive agent, it is difficult to remove and disassemble the light guide body and the image forming optical device from the holding unit when the image reading device is discarded, and thus a technique is required to be improved from the viewpoint of recycling efficiency.

SUMMARY

An advantage of some aspects of the invention is that it provides an image reading device which is easily disassembled without requiring a fixing unit such as an adhesive agent in assembling and improves recycling efficiency, and a method of manufacturing a housing included in the image reading device.

According to an aspect to the invention, there is provided an image reading device including an illumination unit that has a rod-shaped light guide body guiding light from a light source to an object to be read and that illuminates the object; an image forming optical device that is disposed parallel to the light guide body, has a lens array provided with an incidence surface in which a plurality of lens surfaces are arranged in the same direction as a longitudinal direction of the light guide body, and condenses reflected light from the object which is incident on the incidence surface, thereby forming an erect equal-magnification image on a sensor; and a holding unit that holds the light guide body and the image forming optical device. The holding unit includes an insertion hole into which the light guide body is inserted, and a concave groove that is disposed parallel to the insertion hole and into which the image forming optical device is fitted. The light guide body inserted into the insertion hole is disposed so as to partially overlap with the image forming optical device fitted into the concave groove when seen in a plan view, and the separation of the image forming optical device from the concave groove is regulated by the light guide body, thereby holding the image forming optical device in a fitted state.

In the invention configured in this manner, the light guide body inserted into the insertion hole is disposed so as to partially overlap with the image forming optical device fitted into the concave groove that is disposed parallel to the insertion hole when seen in a plan view, and thus the separation of the image forming optical device from the concave groove is regulated by the light guide body, thereby holding the image forming optical device in a fitted state. Therefore, a fixing unit such as an adhesive agent is not required in fixedly disposing the light guide body and the image forming optical device at a predetermined position, and an image reading device is assembled without using an adhesive agent, and thus it is possible to provide the image reading device that is easily disassembled when being discarded and improves recycling efficiency.

In addition, the holding unit may include a frame member and a partition member that partitions an internal space of the frame member into a first space and a second space. The insertion hole and the concave groove may be formed on the first space side of the partition member, and a slit which communicates with the second space and through which light emitted from the image forming optical device passes may be formed at the bottom of the concave groove. Thus, the sensor may be disposed at a position facing the slit in the second space.

With such a configuration, the insertion hole and the concave groove are formed on the first space side of the partition member that partitions the internal space of the frame member into the first space and the second space, and thus the light guide body is inserted into the insertion hole, and the image forming optical device is fitted into the concave groove, thereby disposing the light guide body and the image forming optical device in the first space. The slit which communicates with the second space and through which the light emitted from the image forming optical device passes is formed at the bottom of the concave groove, and thus the sensor is disposed at a position facing the slit in the second space. Therefore, the erect equal-magnification image may be formed on the sensor via the slit by condensing the reflected light from the object to be read using the image forming optical device. In addition, since the first space in which the light guide body is disposed and the second space in which the sensor is disposed are spaced apart from each other by the partition member, there is no concern that the light of the light guide body leaks to the second space, and the generation of noise due to the incidence of the light on the sensor which has leaked from the light guide body may be prevented.

In addition, the illumination unit may further include a light source substrate on which the light source is mounted. The light guide body may be inserted from one end side of the insertion hole, and a mounting surface of the light source of the light source substrate may be brought into contact with and is pressed against the one end side so as to retain the one end side by the light source substrate, to regulate the separation of the light guide body from the insertion hole and hold the light guide body in an insertion state.

In this manner, since the one end side of the light guide body which is inserted from the one end side of the insertion hole is brought into contact with and is pressed against the mounting surface of the light source of the light source substrate so as to be retained by the light source substrate, light of the light source may be reliably incident on the light guide body from the one end side of the light guide body. In addition, since the separation of the light guide body from the insertion hole in the longitudinal direction is regulated by the light source substrate, the light guide body is held in an insertion state, and thus the light source and a member that prevents the light guide body from being retained from the insertion hole may not be individually provided, thereby allowing components constituting the device to be simplified.

In addition, a biasing unit that biases the light guide body in a direction in which the light guide body is separated from the insertion hole may be provided on the other end side of the insertion hole.

Accordingly, in a state where the light guide body is inserted into the insertion hole, the light guide body is biased in a direction in which the light guide body is separated from the insertion hole to the longitudinal direction using the biasing unit, and thus the one end side of the light guide body is pressed against the mounting surface of the light source of the light source substrate and closely contacts the mounting surface by biasing force of the biasing unit, thereby allowing incident efficiency in which the light of the light source is incident on the light guide body to be improved.

In addition, a method of manufacturing a housing including an image reading device that irradiates an object to be read with light from a light source by guiding the light by a light guide body and that reads an erect equal-magnification image formed by condensing reflected light from the object by an image forming optical device using a sensor, wherein the housing holds the light guide body and the image forming optical device by forming an insertion hole and a concave groove, which is disposed parallel to the insertion hole, on one side which is the first space side of a partition member that partitions an internal space of a frame member into a first space in which the light guide body and the image forming optical device are disposed and a second space in which the sensor is disposed, by inserting the light guide body into the insertion hole, and by fitting the image forming optical device into the concave groove, the method including: forming a molding space by disposing a first mold that forms one side of the partition member and a second mold that forms the other side of the partition member so as to face each other, and disposing a plurality of insertion hole forming dies in the form of a row in the molding space; and pouring a liquid serving as a material of the partition member into the molding space and hardening the liquid, wherein in the first mold, a plurality of first dies each having a first bottom forming surface that forms a part of the bottom of the insertion hole are disposed in the form of a row so as to protrude, and a second die that is disposed parallel to the first dies and that forms the concave groove is disposed so as to protrude, each of the insertion hole forming dies includes a second bottom forming surface that forms a remaining part of the bottom of the insertion hole and a pressing surface forming surface that forms a pressing surface for pressing the light guide body, which is disposed so as to face the second bottom forming surface and is inserted into the insertion hole, against the bottom, and wherein the first dies and the insertion hole forming dies are alternately disposed so as to closely adhere to each other in the molding space.

In the invention configured in this manner, the molding space is formed by disposing the first mold that forms one side, which is the first space side of the partition member that partitions the internal space of the frame member into the first space in which the light guide body and the image forming optical device are disposed and the second space in which the sensor is disposed, and the second mold that forms the other side of the partition member so as to face each other, and the plurality of insertion hole forming dies are disposed in the form of a row in the molding space. In addition, the liquid serving as a material of the partition member is poured into the molding space and is then hardened, thereby manufacturing the housing of the image reading device.

In the first mold, the plurality of first dies each having the first bottom forming surface that forms a part of the bottom of the insertion hole are disposed in the form of a row so as to protrude, and the second die that is disposed parallel to the first dies and that forms the concave groove is disposed so as to protrude. Each of the insertion hole forming dies includes the second bottom forming surface that forms a remaining part of the bottom of the insertion hole and the pressing surface forming surface that forms the pressing surface for pressing the light guide body, which is disposed so as to face the second bottom forming surface and is inserted into the insertion hole, against the bottom. The first dies and the insertion hole forming dies are alternately disposed so as to closely adhere to each other in the molding space. Thus, the mold for forming the bottom of the insertion hole is formed, thereby forming the insertion hole including the bottom and the pressing surface on one side of the partition member and forming the concave groove disposed parallel to the insertion hole. Accordingly, the pressing surface of the insertion hole is formed by the insertion hole forming die. However, unlike a case where the pressing surface is formed by protrusively disposing the dies, which each has the pressing surface forming surface that forms the pressing surface, in the second mold, there is no concern that a hole formed when the insertion hole forming die is pulled out from the molding communicates with the other side of the partition member formed by the second mold. Therefore, it is possible to manufacture the housing in which the insertion hole and the concave groove are formed on one side of the partition member in a state where the first space and the second space are reliably spaced apart from each other. In addition, since there is no concern that the light of the light guide body inserted into the insertion hole of the manufactured housing leaks to the second space in which the sensor is disposed, it is possible to prevent the generation of noise due to the incidence of the light on the sensor which has leaked from the light guide body.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
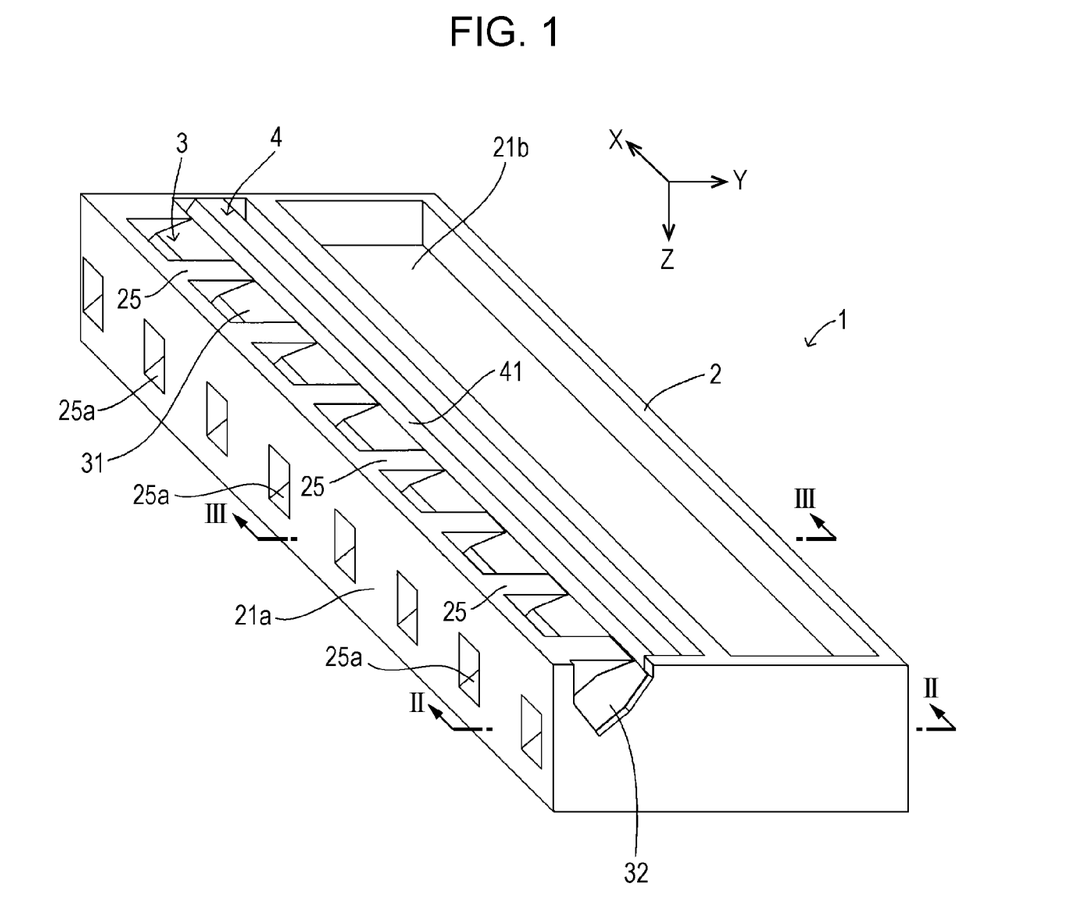
FIG. 1 is a perspective view illustrating a CIS module which is an embodiment of an image reading device.
Figure 2:
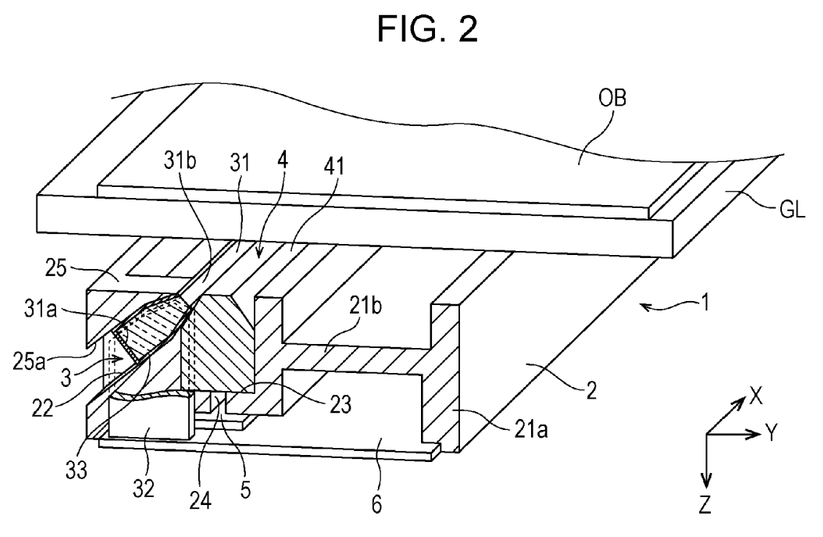
FIG. 2 is a partial cross-sectional perspective view taken along line II-II of FIG. 1.
Figure 3:
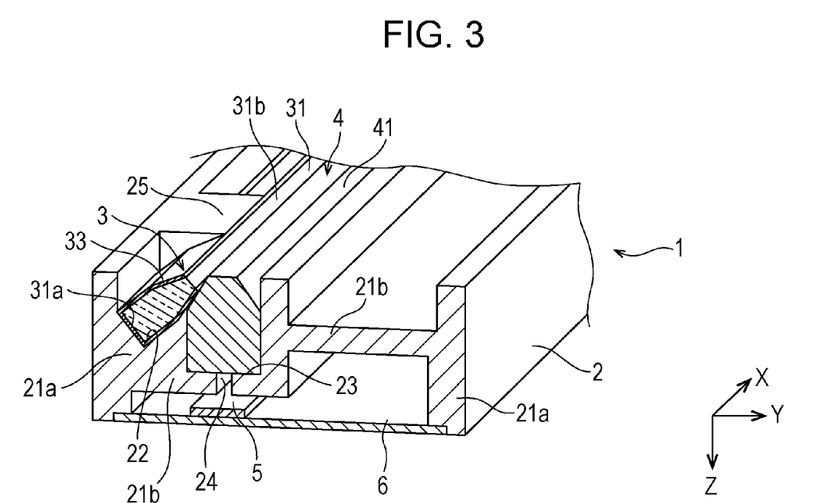
FIG. 3 is a cross-sectional perspective view taken along line III-III of FIG. 1.
Figure 4:
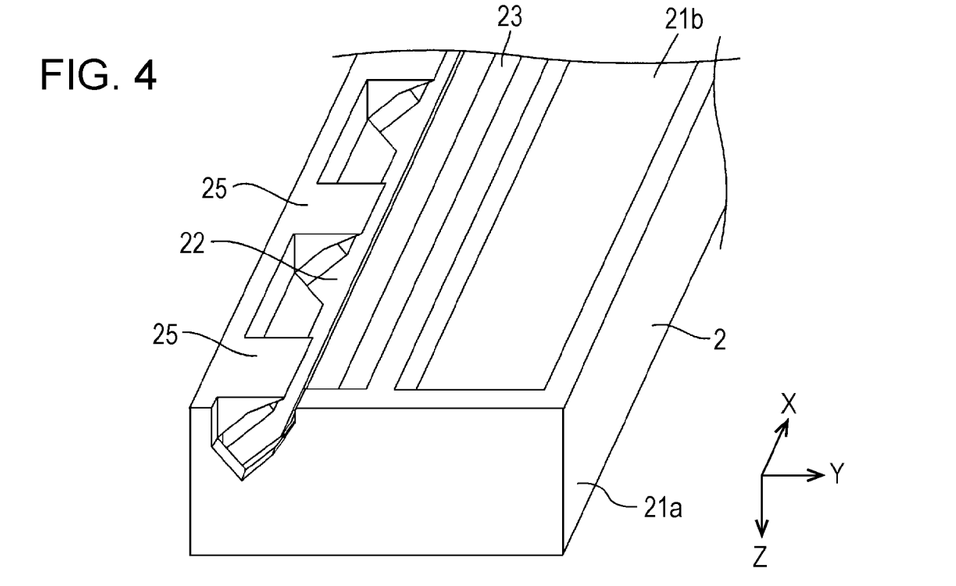
FIG. 4 is a perspective view illustrating a frame included in the CIS module.
Figure 5:
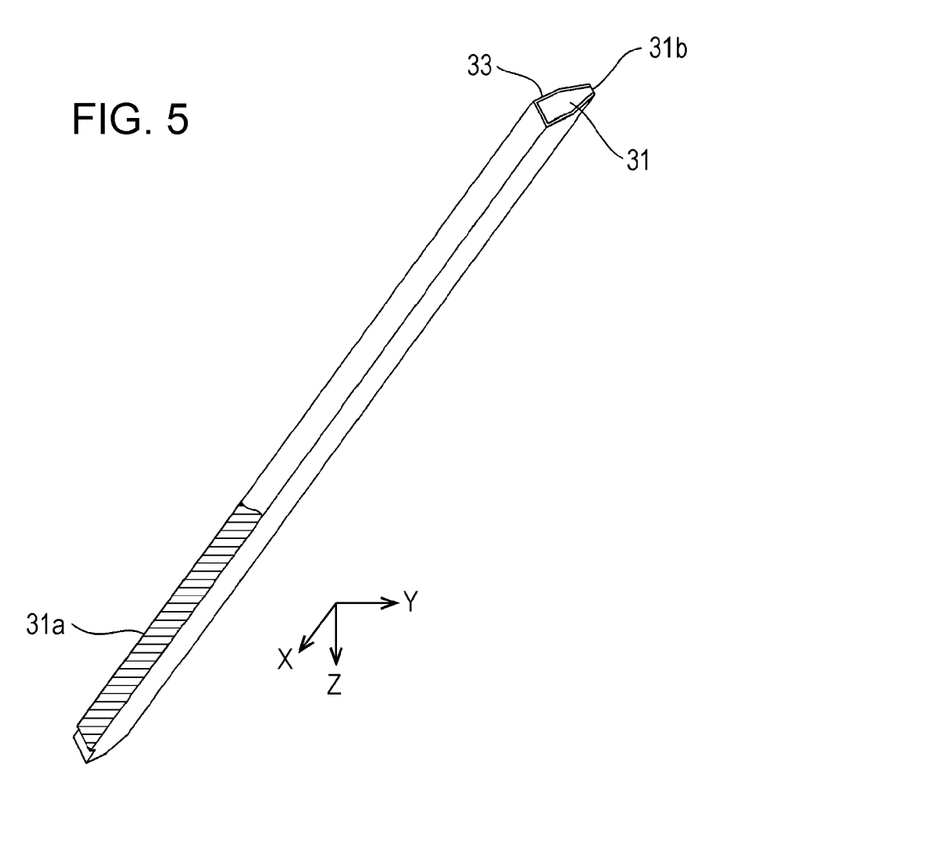
FIG. 5 is a perspective view illustrating a light guide included in the CIS module.
Figure 6:
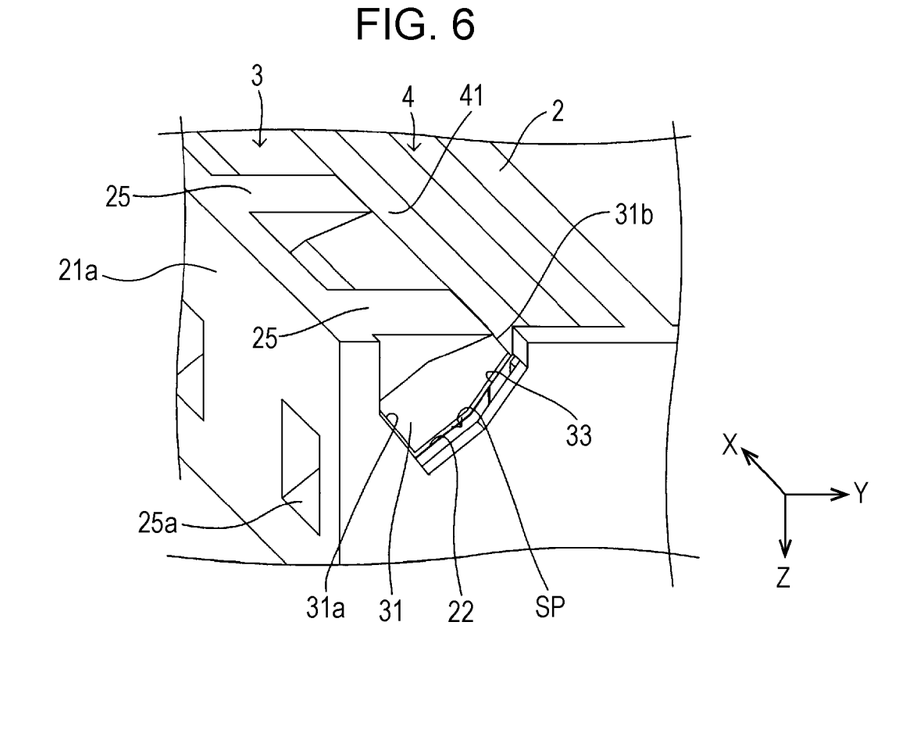
FIG. 6 is an enlarged view illustrating main parts of the CIS module.
Figure 7:
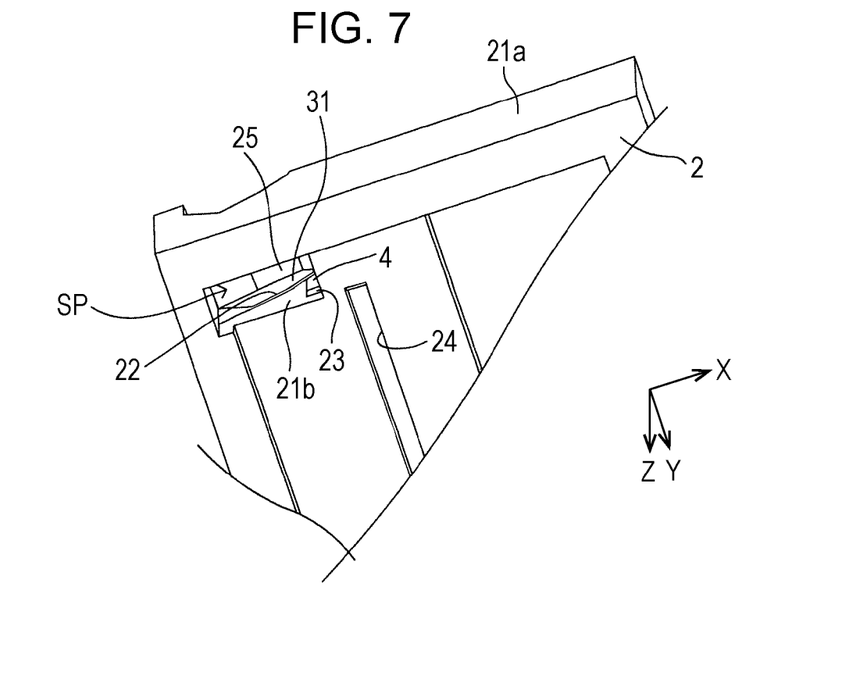
FIG. 7 is a rear view of the CIS module.

Hereinafter, a CIS module which is an embodiment of an image reading device of the invention will be described with reference to FIGS. 1 to 7. FIG. 1 is a perspective view illustrating the CIS module which is an embodiment of the image reading device. FIG. 2 is a partial cross-sectional perspective view taken along line II-II of FIG. 1. FIG. 3 is a cross-sectional perspective view taken along line III-III of FIG. 1. FIG. 4 is a perspective view illustrating a frame included in the CIS module. FIG. 5 is a perspective view illustrating a light guide included in the CIS module. FIG. 6 is an enlarged view illustrating main portions of the CIS module. FIG. 7 is a rear view of the CIS module.

A CIS module 1 (corresponding to "image reading device" of the invention) is a device that reads an image printed onto a document OB by using the document OB placed on a document glass GL as an object to be read, and is disposed directly below the document glass GL. The CIS module 1 has a cuboidal frame 2 (corresponding to "housing" and "holding unit" of the invention) that extends longer than a read range of the document OB in an X direction. An illumination unit 3, a lens unit 4 (corresponding to "image forming optical device" of the invention), a sensor 5, and a printed circuit board 6 are disposed inside the frame 2 by being held by the frame 2.

The frame 2 includes a frame member 21a and an intermediate member 21b (corresponding to "partition member" of the invention). An internal space of the frame member 21a is partitioned by the intermediate member 21b into an upper space (corresponding to "first space" of the invention) for disposing the illumination unit 3 (light guide 31) and the lens unit 4 and a lower space (corresponding to "second space" of the invention) for disposing the printed circuit board 6 provided with the sensor 5 and an LED substrate 32 of the illumination unit 3. In addition, an inclined groove 22 for inserting the light guide 31 included in the illumination unit 3, and a concave groove 23 disposed in parallel with the inclined groove 22 and for fitting the lens unit 4 extend in the X direction on the upper space side of the intermediate member 21b. A slit 24 for transmitting light, emitted from the lens unit 4, which has a predetermined read width in the X direction extends in the X direction at the bottom of the concave groove 23, and an upper space and a lower space of the frame 2 communicate with each other via the slit 24.

A plurality of pressing members 25 for pressing the light guide 31 disposed in the inclined groove 22 from above are provided at predetermined intervals in the X direction above the bottom of the inclined groove 22 in the frame 2. The pressing members 25 protrude inward from a lateral wall (frame member 21a) of the frame 2 which is adjacent along the inclined groove 22 so as to be integrally formed with the frame 2. In addition, a pressing surface that presses the light guide 31 disposed on the lower surface sides of the pressing members 25 against the bottom of the inclined groove 22 is formed in substantially the same shape as an upper outer circumferential surface of the light guide 31 which is an object to be pressed.

In addition, the light guide 31 inserted into the inclined groove 22 from one end side (front side toward the paper plane of FIG. 1) of the inclined groove 22 partially overlaps with the lens unit 4 fitted into the concave groove 23 along the X direction when seen in a plan view. In addition, in a state where the light guide 31 is pressed from above by the pressing members 25, a portion chamfered along the longitudinal direction (X direction) on the lower side of the light emitting surface 31b of the light guide 31 comes into contact with a portion chamfered along the longitudinal direction (X direction) of an upper left portion of a case body 41 of the lens unit 4 fitted into the concave groove 23. The lens unit 4 is pressed inward the concave groove 23 by the light guide 31 that is pressed by the pressing members 25, and thus the separation of the lens unit 4 from the concave groove 23 in an opposite direction to the direction of arrow Z is regulated, thereby holding the lens unit 4 in the concave groove 23 in a fitted state.

Meanwhile, since the pressing surface of the pressing member 25 is formed in substantially the same shape as the upper outer circumferential surface of the light guide 31 which is an object to be pressed, in a state where the lens unit 4 is fitted into the concave groove 23 and the light guide 31 is inserted into the inclined groove 22, the movement of the light guide 31 in a direction other than the direction (X direction) in which the light guide 31 is inserted into the inclined groove 22, that is, falling out of the light guide 31 from the inclined groove 22, is regulated by the pressing member 25. In addition, rectangular holes 25a that pass through a lower portion of the pressing member and are communicated with the inclined groove 22 are formed at positions of the lateral wall (frame member 21a) of the frame 2 which correspond to the respective pressing members 25. As will be described later with reference to FIGS. 10 to 13, the holes 25a are formed by obliquely disposing the inclined groove 22 and pressing member forming dies 203 for forming the pressing members 25 in the upper space of the frame 2. As described above, an "insertion groove" of the invention is configured by the inclined groove 22 and the pressing members 25.

The illumination unit 3 illuminates the document OB by using an LED (Light Emitting Diode: not shown) that is provided in the LED substrate 32 (corresponding to "light source substrate" of the invention) attached to the printed circuit board 6 as a light source and by having the light guide 31 (corresponding to "light guide body" of the invention) that guides light of the LED to the document OB placed on the document glass GL. Meanwhile, the LED substrate 32 is partially illustrated in FIG. 2 by illustrating the shape of an upper end portion thereof as a dotted line.

The light guide 31 is formed of a transparent member such as an acryl resin or glass, and has substantially the same length as the read range of the CIS module 1, and thus the light guide 31 is disposed in the X direction by being inserted into the inclined groove 22 provided in an upper surface of the intermediate member 21b. In addition, the light guide 31 has a reflecting surface 31a in which a reflection structure reflecting the light of the LED, which is incident into the light guide 31 from an end surface on one end side thereof (front side toward the paper plane of FIG. 2), is formed, and a light emitting surface 31b from which the light reflected by the reflecting surface 31a is emitted toward the document OB.

The reflecting surface 31a and the light emitting surface 32b are formed on the outer circumferential surface of the light guide 31 along the longitudinal direction and are disposed so as to face each other with the transparent member interposed therebetween. A width of the light emitting surface 31b in the cross section perpendicular to the longitudinal direction of the light guide 31 is formed to be smaller than that of the reflecting surface 31a.

In addition, the cross section perpendicular to the longitudinal direction of the light guide 31 has a hexagonal shape that tapers toward the light emitting surface 31b side from the reflecting surface 31a side. A portion of the light guide 31 which faces the lens unit 4 is chamfered along the light emitting surface 31b in the longitudinal direction. The chamfered portion of the light guide 31 contacts a portion of the lens unit 4 which is similarly chamfered along the X direction, and thus the light emitting surface 31b is disposed close to the lens unit 4. As illustrated in FIG. 5, the illumination unit 3 further includes a light shielding film 33 covering the outer circumferential surface of the light guide 31 except for the light emitting surface 31b, and a scattering surface that scatters light is formed on a surface of the light shielding film 33 which comes into contact with the light guide 31 (transparent member). Meanwhile, in the embodiment, the light shielding film 33 is formed to have a thickness of approximately 125 μm. In addition, the light shielding film 33 covered with the reflecting surface 31a is partially illustrated in FIG. 5.

In addition, as illustrated in FIGS. 6 and 7, the light emitting surface 31b is inserted into the inclined groove 22 formed in the upper surface of the intermediate member 21b of the frame 2 in the X direction toward the lens unit 4 side from one end side on the front side of the light guide 31 toward the paper plane, and thus an insertion space SP for inserting the LED substrate 32 is formed at a position of the end surface on the front side of the light guide 31. As illustrated in FIGS. 1 and 2, the printed circuit board 6 provided with the LED substrate 32 is disposed at a predetermined position in the lower space of the frame 2, and thus the LED substrate 32 is inserted into the insertion space SP from the lower side thereof. Accordingly, an end surface on a tip side of the LED substrate 32 is positioned by coming into contact with the pressing surfaces of the pressing members 25, and thus the LED provided in the LED substrate 32 is disposed so as to face the end surface on the front side which is one end side of the light guide 31 in the longitudinal direction.

If illumination light from the LED is incident from one end side of the light guide 31, the illumination light is propagated through the light guide 31 toward the other end side of the light guide 31 and is scattered by the reflecting surface 31a. The illumination light scattered by the reflecting surface 31a is totally reflected by the outer circumferential surface (light shielding film 33) inside the light guide 31, and is thus condensed toward the light emitting surface 31b. The condensed illumination light is emitted toward the document glass GL from the light emitting surface 31b, and is thus irradiated in a state where the illumination light is condensed in the document OB on the document glass GL. In this manner, the document OB is irradiated with band-like illumination light extending in the X direction, and the illumination light is reflected by the document OB.

Meanwhile, a biasing unit (not shown) formed of an elastic member such as a sponge, rubber, or a spring is provided on an inner wall surface of the frame 2 (frame member 21a) which comes into contact with an end surface on one end side that is opposite to the other end side of the light guide 31 on which illumination is incident from the LED. The light guide 31 is biased using the biasing unit in a direction (opposite direction to the direction of arrow X) in which the light guide 31 escapes (separated) from the inclined groove 22, and thus the light guide 31 comes into contact with the LED provided in the LED substrate 32. The LED substrate 32 that is inserted into the insertion space SP from below is positioned by coming into contact with the inner wall surface of the frame 2 which faces an inner wall surface provided with the biasing unit in a direction in which the LED substrate 32 is pressed by the light guide 31 biased by the elastic member. Therefore, the one end side of the light guide 31 which comes into contact with a mounting surface of the LED of the LED substrate 32 is pressed so as to be retained by the LED substrate 32, and thus the separation of the one end side of the light guide 31 from the inclined groove 22 of the light guide 31 is regulated, thereby holding the insertion state of the light guide 31 into the inclined groove 22. Therefore, the light guide 31 is fixed into the inclined groove 22 by being exactly positioned between the biasing unit and the LED substrate 32.

In other words, since the one end side of the light guide 31 inserted from one end side of the inclined groove 22 is pressed so as to be retained by the LED substrate 32 by bringing the one end side of the light guide 31 into contact with the mounting surface of the LED of the LED substrate 32, light of the LED can be reliably incident on the light guide 31 from the one end side of the light guide 31. In addition, since the insertion state of the light guide 31 is held by regulating the separation of the light guide 31 from the inclined groove 22 by the LED substrate 32, the LED and a member that prevents the light guide 31 from being retained from the inclined groove 22 may not individually be provided, thereby allowing components constituting the CIS module 1 to be simplified.

In addition, in the insertion state of the light guide 31 into the inclined groove 22, the light guide 31 is biased in a direction in which the light guide 31 is separated from the inclined groove 22 using the biasing unit, and thus the one end side of the light guide 31 closely contacts the mounting surface of the LED of the LED substrate 32 by being pressed against the mounting surface by biasing force of the biasing unit, thereby allowing incident efficiency in which the light of the LED is incident on the light guide 31 to be improved.

In addition, since the upper space of the frame 2 in which the illumination unit 3 is disposed and the lower space in which the sensor 5 (printed circuit board 6) is disposed are spaced apart from each other by the intermediate member 21b, there is no concern that the light of the illumination unit 3 leaks to the lower space, thereby preventing the generation of noise due to the incidence of the light on the sensor 5 which has leaked from the illumination unit 3.

The above-described concave groove 23 is provided in the X direction at an irradiation position directly below a position of the illumination light using the illumination unit 3, and the lens unit 4 is disposed in parallel with the light guide 31 by being fitted into the concave groove 23. The lens unit 4 includes a lens array (not shown) provided with an incidence surface in which each lens surface is arranged in the same X direction as the longitudinal direction of the light guide 31 in a state where mutual optical axes of a plurality of lenses are parallel to each other, and the case body 41 that accommodates the lens array. In addition, the lens unit 4 forms an erect equal-magnification image of the document OB on the sensor 5 by condensing the reflected light from the document OB which is incident on the incidence surface.

The lens array extends in the X direction by substantially the same length as the read range of the CIS module 1, and is integrally molded by a transparent medium such as a resin or glass having optical transparency with respect to the illumination light. In addition, a plurality of through holes (not shown) that are pierced so as to correspond to the respective lenses are formed along the X direction in the case body 41 on the incidence side of the lens array, and an incident direction of the reflected light emitted from the document OB is regulated by the through holes. In addition, a plurality of through holes (not shown) that are pierced so as to correspond to the respective lenses are formed along the X direction in the case body 41 on the emission side of the lens array, and an emission direction of the light emitted from the lens array is regulated by the through holes.

In other words, on the incidence side and the emission side of the lens array, the case body 41 in which the plurality of through holes are formed along the X direction serves as an aperture member for the lens array, and thus the incidence of stray light on the sensor 5 is prevented. Meanwhile, the slit 24 that is formed in the X direction at the bottom of the concave groove 23 provided in the intermediate member 21b of the frame 2 is formed at a position at which optical axes on the emission side of the lenses constituting the lens array are arranged in the X direction, and the slit 24 is formed so as to be wider to a certain extent than the optical axis of each lens on the emission side in the X direction. The reflected light incident on the lens unit 4 passes through the slit 24 and is condensed on the sensor 5 disposed at a position facing the slit 24, and thus the erect equal-magnification image is formed on the sensor 5.

A portion of the case body 41 which faces the light guide 31 is chamfered along the X direction, and as described above, the chamfered portion of the light guide 31 comes into contact with the chamfered portion of the case body 41 and presses the case body 41 inward the concave groove 23, and thus the lens unit 4 (case body 41) is fixed inside the concave groove 23 of the frame 2.

As illustrated in FIG. 2, the sensor 5 is attached in the X direction to the printed circuit board 6 on which the LED substrate 32 is mounted, and thus the sensor 5 reads the erect equal-magnification image of the document OB and outputs a signal associated with the erect equal-magnification image.

The CIS module 1 configured as described above is assembled as follows. In other words, as illustrated in FIGS. 6 and 7, first, the lens unit 4 is fitted into the concave groove 23 provided on the upper space side of the frame 2, and thus the light guide 31 is inserted into the inclined groove 22. As illustrated in FIGS. 1 and 2, the printed circuit board 6 is disposed at a predetermined position of the lower space of the frame 2 so that the LED substrate 32 is inserted into the insertion space SP from the lower side thereof, and thus the assembling of the CIS module 1 is completed.

Figure 8A:
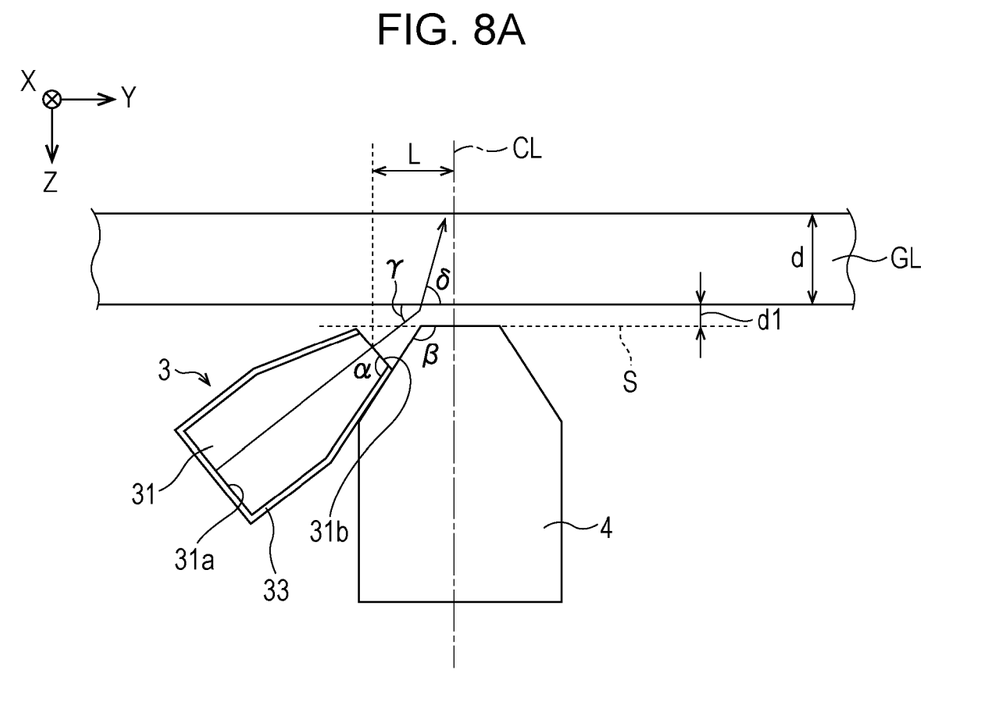
FIGS. 8A and 8B are diagrams illustrating an illumination state of a document using a light guide.
Figure 8B:
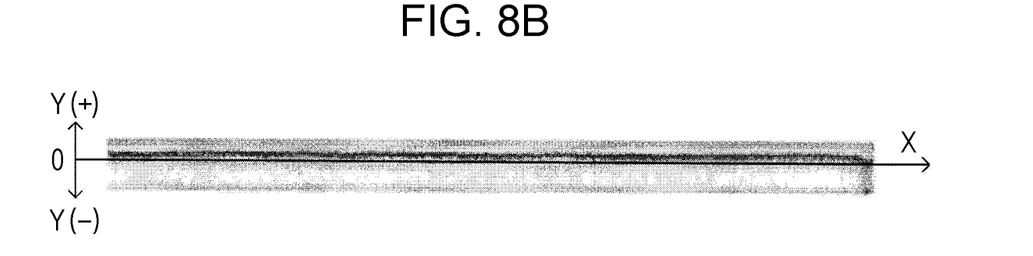

Next, an example of an arrangement relationship between the light guide 31 and the lens unit 4 will be described with reference to FIGS. 8A and 8B. FIGS. 8A and 8B are diagrams illustrating an illumination state of a document using a light guide. FIG. 8A illustrates the arrangement relationship between the light guide and the lens unit, and FIG. 8B illustrates the illumination state of the document. In addition, in FIG. 8B, the position of an original point O in a Y direction corresponds to the position of an optical axis CL of the lens unit 4 in the cross section perpendicular to the X direction, a Y(+) direction indicates the lens unit side, a Y(−) direction indicates the light guide side, and the original point O side indicates the end surface side of the light guide 31 on which the illumination light is incident by the LED. In addition, FIG. 8B illustrates brightness in the X direction at the position of the optical axis CL which is derived from a simulation using illumination analysis software "LightTools" made by Cybernet Systems Co., Ltd.

In the embodiment, a width of the reflecting surface 31a, a width of the light emitting surface 31b, and a distance between the reflecting surface 31a and the light emitting surface 31b in the cross section perpendicular to the longitudinal direction of the light guide 31 are set to 2 mm, 0.8 mm, and 4 mm, respectively. In addition, since the document glass GL is formed of a material having a refractive index n of 1.51, when an angle formed by a normal line of the light emitting surface 31b of the light guide 31 and the document glass GL is γ, an angle δ formed by a traveling direction of light that is incident on the document glass GL and is then refracted and the document glass GL is sin δ=(sin γ)/1.51.

Therefore, when a distance between a top surface of the lens unit 4 and a lower surface of the document glass GL is d1 and the thickness of the document glass GL is d, in order for light emitted from the light guide 31 to be irradiated onto an intersection between an upper surface of the document glass GL and the optical axis CL of the lens unit 4, a distance L between the center of the light emitting surface 31b in the cross section perpendicular to the longitudinal direction of the light guide 31 and the optical axis CL of the lens unit 4 can be represented as L=d1/tan(γ)+d/tan(δ). In the embodiment, since the distance d1 between the top surface of the lens unit 4 and the lower surface of the document glass GL is set to 0.66 mm and the thickness d of the document glass GL is set to 2.8 mm, for example, when the angle γ formed by the normal line of the light emitting surface 31b of the light guide 31 and the document glass GL is 40 degrees, the distance L between the center of the light emitting surface 31b and the optical axis CL of the lens unit 4 is approximately 2.4 mm. Therefore, in the above-described conditions, when the light guide 31 and the lens unit 4 are disposed such that the distance between the center of the light emitting surface 31b and the optical axis CL is 2.4 mm, the position of the optical axis CL of the document OB is appropriately illuminated in the form of a band extending in the X direction by the illumination light emitted from the light emitting surface 31b.

In addition, as illustrated in FIG. 8A, the lateral wall of the frame 2, upper surfaces of the pressing members 25, and a top surface in which the through holes of the case body 41 of the lens unit 4 are formed are disposed on substantially the same plane S, and thus the light guide 31 is disposed so as not to protrude from the document glass GL beyond the plane S.

Meanwhile, in the embodiment, chamfering is performed on the light guide 31 so that an angle α with the light emitting surface 31b is 100 to 140 degrees, and chamfering is performed on the lens unit 4 so that an angle β with the top surface is 100 to 140 degrees. Therefore, the incidence surface of the light guide 31 and the incidence surface of the lens unit 4 are disposed close to each other so that the distance L is equal to or less than 2.4 mm. In addition, the light guide 31 and the lens unit 4 are disposed such that a relationship between a chambering angle α of the above-described light guide 31, a chambering angle β of the lens unit 4, and an incident angle γ of a light beam satisfies the expression, α+α+γ=270 degrees, and thus the light emitted from the light emitting surface 31b of the light guide 31 is irradiated in the form of a band onto a portion where the upper surface of the document glass GL and the optical axis CL of the lens unit 4 intersect.

In other words, as illustrated in FIG. 8B, in a state where an irradiation center minutely leans to the light guide 31 side, the light emitted from the light emitting surface 31b of the light guide 31 is appropriately irradiated in the form of a band with light utilization efficiency of 19.2% with respect to the portion where the upper surface of the document glass GL and the optical axis CL of the lens unit 4 intersect.

COMPARATIVE EXAMPLE

Figure 9A:
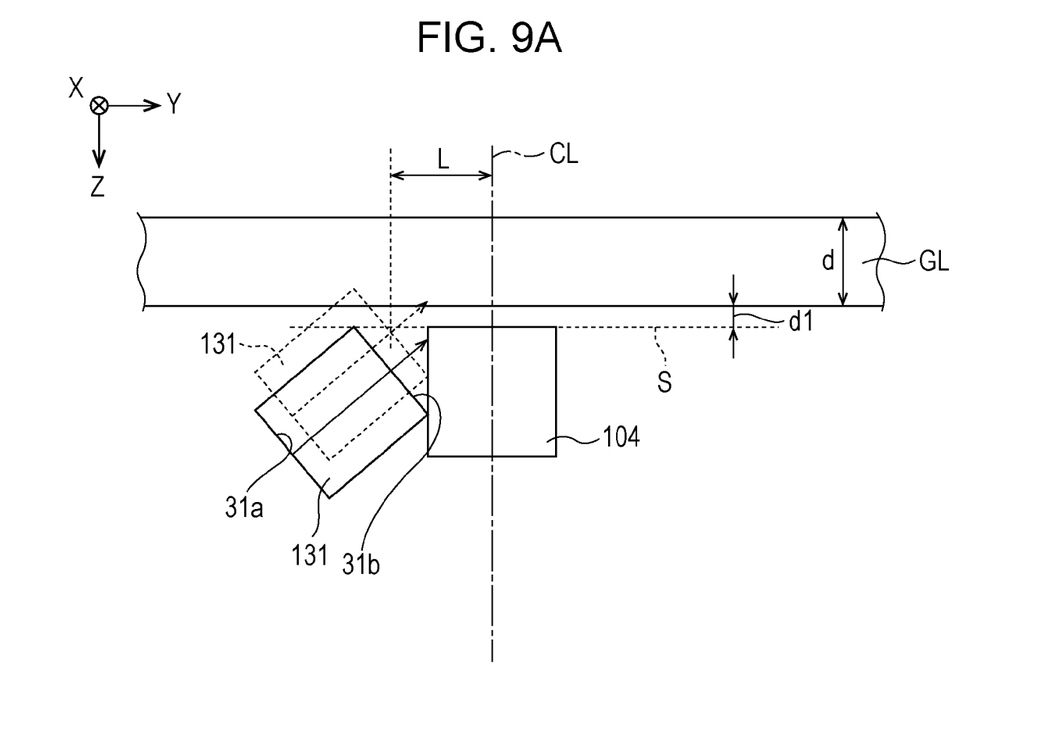
FIGS. 9A and 9B are diagrams illustrating an illumination state of a document according to a comparative example.
Figure 9B:
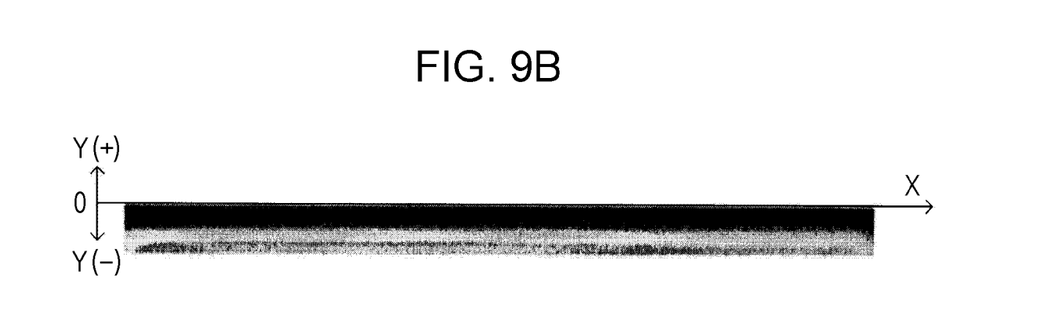

Hereinafter, a comparative example will be described with reference to FIGS. 9A and 9B. FIGS. 9A and 9B are diagrams illustrating an illumination state of a document according to the comparative example. FIG. 9A illustrates an arrangement relationship between a light guide and a lens unit, and FIG. 9B illustrates the illumination state of the document. As illustrated in FIG. 9A, in the comparative example, the above-described chamfering is not performed on outer peripheries of a light guide 131 and a lens unit 104, and the cross section of each of the light guide 131 and the lens unit 104 which is perpendicular to the longitudinal direction (X direction) is formed to have a rectangular shape. In addition, the light emitting surface 31b of the light guide 131 in the cross section perpendicular to the longitudinal direction is formed to have the same width as the reflecting surface 31a. Other components are the same as the above-described example, and thus a description thereof will not be repeated by providing the same reference numerals.

In the comparative example, since chamfering is not performed on the light guide 131 and the lens unit 104, the light guide 131 and the lens unit 104 cannot be disposed close to each other. Further, illumination light of an LED which is incident on the light guide 131 is not condensed toward the light emitting surface 31b. Therefore, as illustrated in FIG. 9B, the illumination center leans to the light guide 131 side to a large extent, and thus the portion where the upper surface of the document glass GL and the optical axis CL of the lens unit 4 intersect is hardly illuminated with light emitted from the light emitting surface 31b of the light guide 131.

In addition, as illustrated as a dotted line in FIG. 9B, in order for the portion where the upper surface of the document glass GL and the optical axis CL of the lens unit 4 intersect to be illuminated with the light emitted from the light emitting surface 31b of the light guide 131, the light guide 131 has to be disposed on the upper side excessively beyond the plane S. However, since the document glass GL is disposed directly above the CIS module 1, it is not practically possible to dispose the light guide 131 at a position of the dotted line in FIG. 9B.

Method of Molding Frame

Figure 10:
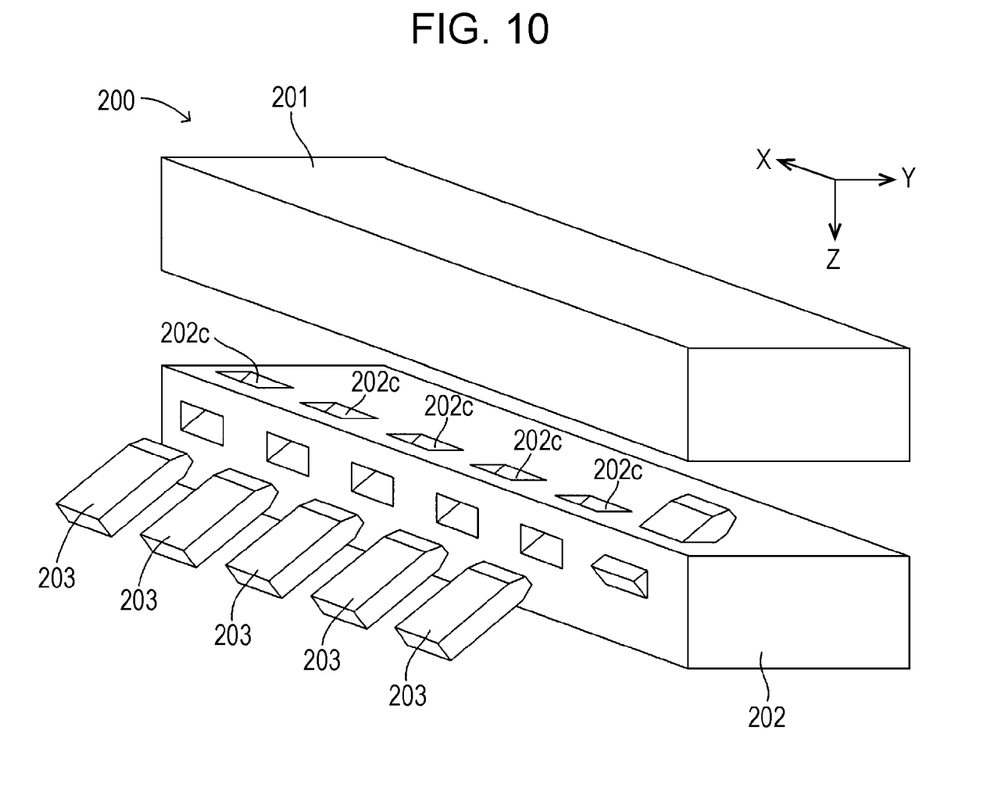
FIG. 10 is a perspective view illustrating a mold for molding a frame.
Figure 11:
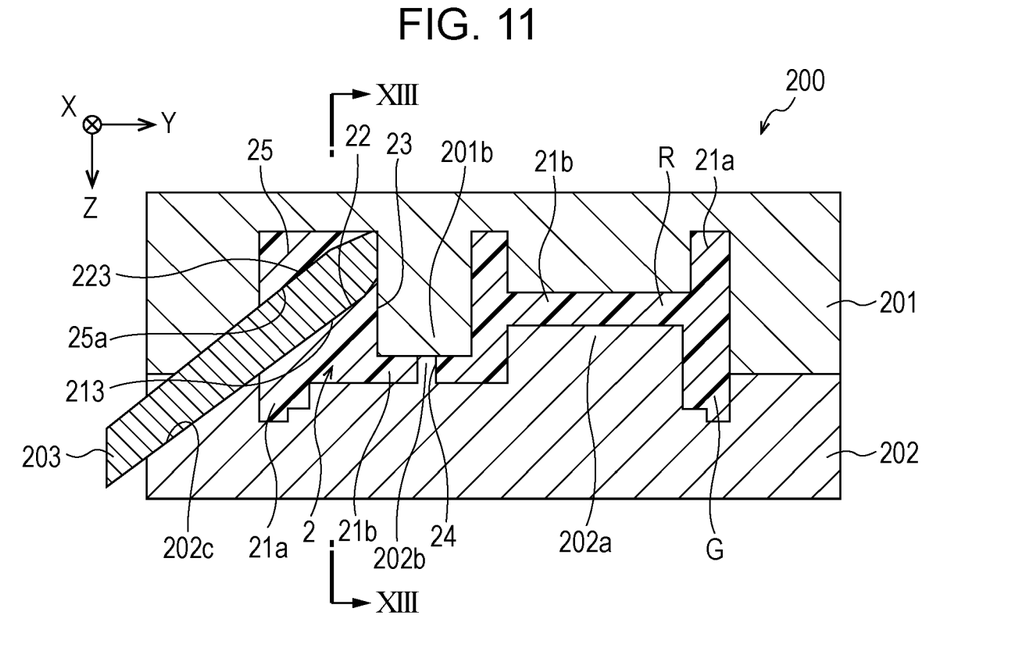
FIG. 11 is a cross-sectional view of a mold at a position corresponding to a cross section of a frame illustrated in FIG. 2.
Figure 12:
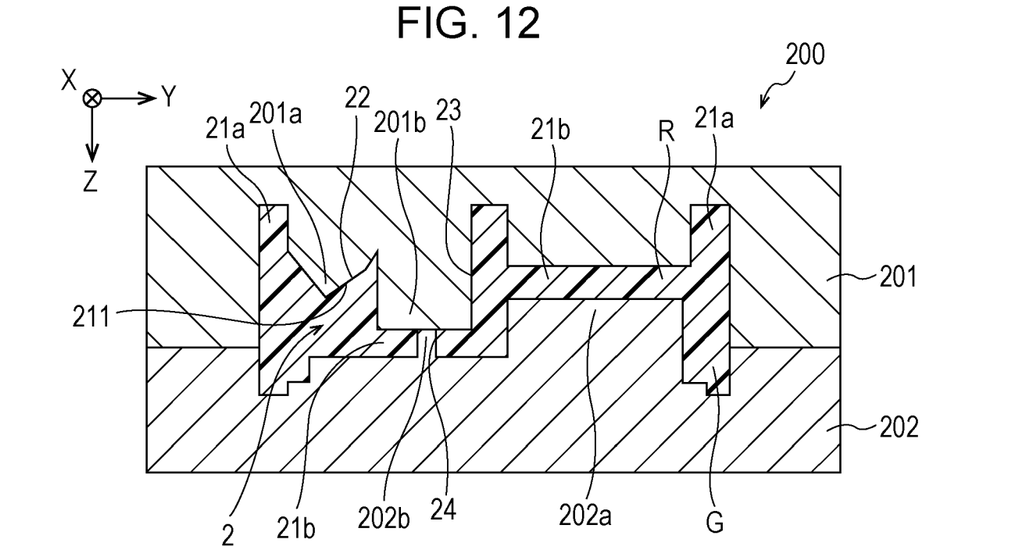
FIG. 12 is a cross-sectional view of a mold at a position corresponding to a cross section of a frame illustrated in FIG. 3.
Figure 13:
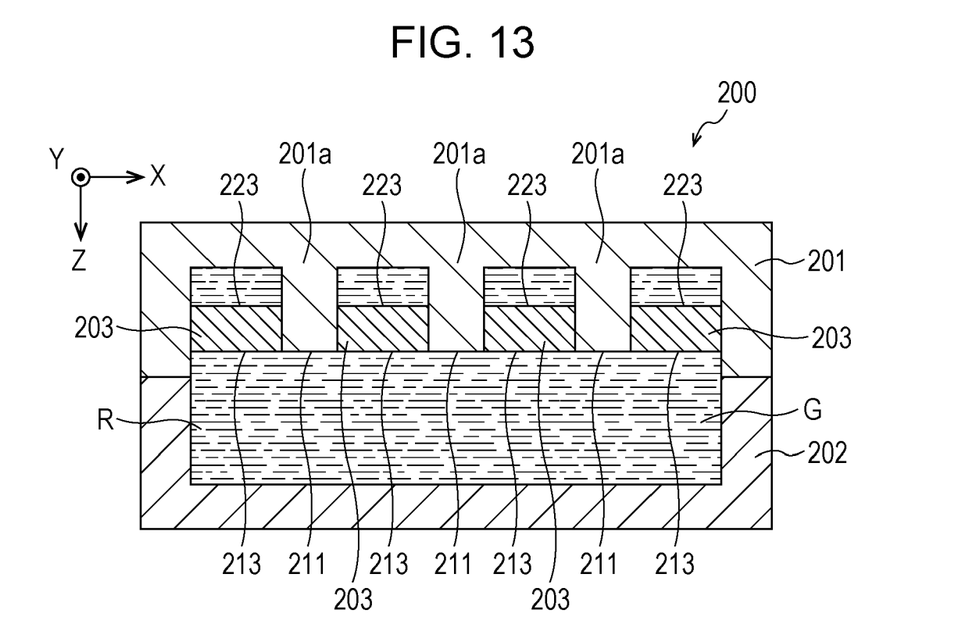
FIG. 13 is a schematic view illustrating an arrangement relationship between a mold and a pressing member forming die.

Hereinafter, an example of a method of molding (method of manufacturing) a frame will be described with reference to FIG. 2, FIG. 3, and FIGS. 10 to 13. FIG. 10 is a perspective view illustrating a mold for molding the frame. FIG. 11 is a cross-sectional view of the mold at a position corresponding to the cross section of the frame illustrated in FIG. 2. FIG. 12 is a cross-sectional view of the mold at a position corresponding to the cross section of the frame illustrated in FIG. 3. In addition, FIG. 13 is a schematic view illustrating an arrangement relationship between the mold and a pressing member forming die, and is a cross-sectional view parallel to a plane X-Z taken along line XIII-XIII illustrated in FIGS. 11 and 12. A mold 200 for molding the frame 2 includes an upper mold 201 (corresponding to "first mold" of the invention) that forms one side of the intermediate member 21b, a lower mold 202 (corresponding to "second mold" of the invention) that forms the other side of the intermediate member 21b, and pressing member forming dies 203 (corresponding to "insertion hole forming die" of the invention) that form the bottom of the inclined groove 22 and the pressing surfaces of the pressing members 25.

In addition, on the lower surface side of the upper mold 201, a plurality of first dies 201a each having a first bottom forming surface 211 for forming a part of the bottom of the inclined groove 22 on one side (upper surface) of the intermediate member 21b disposed on the first space side are provided so as to protrude in the form of a row in the X direction, and a second die 201b, disposed in parallel to the first dies 201a, for forming the concave groove 23 is provided so as to protrude. In addition, on the upper surface side of the lower mold 202, a die 202a for forming the shape of the other side (lower surface) of the intermediate member 21b disposed on the second space side and a die 202b for forming the slit 24 are provided so as to protrude. In addition, a plurality of inclined holes 202c communicating with the upper surface from the lateral surface on the left side toward the paper plane are provided along the longitudinal direction (X direction) in the lower mold 202. The pressing member forming dies 203 are inserted into the respective inclined holes 202c so that tips of the pressing member forming dies 203 protrude from the lateral side of the lower mold 202 to the upper surface side thereof.

The pressing member forming dies 203 each includes a second bottom forming surface 213 for forming a remaining part of the bottom of the inclined groove 22 on one side (upper side) of the intermediate member 21b disposed on the first space side, and a pressing surface forming surface 223 for forming the pressing surfaces of the pressing members 25 for pressing the light guide 31, which is disposed so as to face the bottom forming surface 211 and is inserted into the inclined groove 22, against the bottom of the inclined groove 22. Meanwhile, the pressing surface forming surface 223 on the upper surface side of the tip of each pressing member forming die 203 protruding from the upper surface of the lower mold 202 is formed to have substantially the same shape as an upper circumferential surface of the light guide 31 inserted into the inclined groove 22 of the frame 2.

In a state where each pressing member forming die 203 is inserted into each inclined hole 202c of the lower mold 202, the upper mold 201 and the lower mold 202 engage with each other by closely adhering a lower surface of the upper mold 201 to an upper surface of the lower mold 202, and thus a molding space G in which a liquid R such as a resin for forming the frame 2 is filled is formed between the lower surface of the upper mold 201 and the upper surface of the lower mold 202. Meanwhile, as illustrated in FIG. 13, the dies 201a for forming the inclined groove 22 provided in the lower surface of the upper mold 201 is formed in the molding space G so as to be tightly stuck between the pressing member forming dies 203 protruding on the upper surface side of the lower mold 202 in a state where the upper mold 201 and the lower mold 202 are combined together. In other words, the dies 201a of the upper mold 201 and the pressing member forming dies 203 are alternately arranged in the longitudinal direction (X direction) so as to closely adhere to each other, and thus a mold for forming the bottom of the inclined groove 22 of the frame 2 is formed by the bottom forming surfaces 211 and 213 below the dies 201a and the pressing member forming dies 203 disposed in close contact with each other, and a mold for forming the pressing surfaces of the pressing members 25 is formed by the pressing surface forming surface 223 above the pressing member forming dies 203.

The upper mold 201, the lower mold 202, and the pressing member forming dies 203 that are configured in this manner are combined together, the upper mold 201 and the lower mold 202 are disposed so as to face each other, and thus the molding space G is formed, and the plurality of pressing member forming dies 203 are disposed in the molding space. The liquid R such as a melt resin is poured into the molding space G, and the liquid R is hardened by heating or by irradiation with ultraviolet rays. Then, after the pressing member forming dies 203 are pulled out, the upper mold 201 and the lower mold 202 are removed, thereby completing the frame 2.

As described above, in the above-described embodiment, the light guide 31 inserted into the inclined groove 22 is disposed so as to partially overlap with the lens unit 4 that is fitted into the concave groove 23 disposed parallel to the inclined groove 22 when seen in a plan view, and thus the separation of the lens unit 4 from the concave groove 23 is regulated by the light guide 31, thereby holding the lens unit 4 in a fitted state. Therefore, a fixing unit such as an adhesive agent is not required in fixedly disposing the light guide 31 and the lens unit 4 at a predetermined position of the frame 2, and the CIS module 1 is assembled without using an adhesive agent, and thus it is possible to provide the CIS module 1 that is easily disassembled when being discarded and improves recycling efficiency.

In addition, the pressing surfaces of the pressing members 25 are formed by the pressing member forming dies 203. However, unlike a case where the pressing surface is formed by protrusively disposing the dies, which each has the pressing surface forming surface that forms the pressing surface, in the lower mold 202, there is no concern that a hole formed when the pressing member forming dies 203 are pulled out from a molding (frame 2) communicates with the other side (lower space) of the intermediate member 21b formed by the lower mold 202.

In other words, the pressing member forming dies 203 are inserted into the mold 200 in which the upper mold 201 and the lower mold 202 are combined together from the side above the position corresponding to the intermediate member 21b, and thus the pressing members 25 disposed above the inclined groove 22 of the frame 2 are formed. Therefore, when the frame 2 is formed, there is no concern that a hole (bore) via which the upper space and the lower space communicate with each other is formed in the intermediate member 21b, aside from the slit 24 through which the light emitted from the lens unit 4 passes in order to form the erect equal-magnification image on the sensor 5. Accordingly, it is possible to mold the frame 2 in which the inclined groove 22 (pressing members 25) and the concave groove 23 are formed in the upper surface on one side of the intermediate member 21b in a state where the upper space and the lower space are reliably spaced apart from each other. Therefore, since there is no concern that the light of the light guide 31 that is inserted into the inclined groove 22 of the molded frame 2 and is disposed in the upper space leaks to the lower space in which the sensor 5 is disposed, it is possible to reliably prevent the generation of noise due to the incidence of the light on the sensor 5 which has leaked from the light guide 31. In addition, since it is possible to reliably prevent the light of illumination unit 3 from leaking to the sensor 5, the light shielding film 33 covering the light guide 31 can be omitted.

In addition, the rod-shaped light guide 31 that guides the light of the LED to the document OB is formed of a transparent member. Further, the light guide 31 includes the reflecting surface 31a in which a reflection structure reflecting the light of the LED, which is incident into the light guide 31 from at least one end surface of the light guide 31, is formed, and the light emitting surface 31b from which the light reflected by the reflecting surface 31a is emitted toward the document OB. The reflecting surface 31a and the light emitting surface 31b are formed along the longitudinal direction (X direction) in the outer circumferential surface of the light guide 31 and are disposed so as to face each other with the transparent member interposed therebetween. Since the light emitting surface 31b in the cross section perpendicular to the longitudinal direction of the light guide 31 is formed to have a width smaller than that of the reflecting surface 31a, the light of the LED which is incident from the end surface of the light guide 31 and is scattered across the longitudinal direction in the reflecting surface 31a is totally reflected inside the transparent member by the outer circumferential surface of the light guide 31, is condensed toward the light emitting surface 31b, and is emitted in the form of a band toward the document OB from the light emitting surface 31b.

Therefore, since the light condensed toward the light emitting surface 31b inside the light guide 31 is emitted in the form of a band toward the document OB from the light emitting surface 31b, it is possible to provide the CIS module 1 including the illumination unit 3 capable of illuminating the portion where the document OB and the optical axis CL of the lens array included in the lens unit 4 intersect, in the form of a band with high efficiency using the illumination unit 3.

In addition, since the cross section perpendicular to the longitudinal direction of the light guide 31 has a shape that tapers toward the light emitting surface 31b side from the reflecting surface 31a side, it is possible to condense the light of the LED which is scattered across the longitudinal direction in the reflecting surface 31a toward the light emitting surface 31b with high efficiency by totally reflecting the light by the outer circumferential surface of the light guide 31. Therefore, it is possible to illuminate the document OB with light emitted toward the document OB from the light emitting surface 31b in the form of a band with higher efficiency. In addition, since the cross section perpendicular to the longitudinal direction of the light guide 31 has a shape that tapers toward the light emitting surface 31b side from the reflecting surface 31a side, it is possible to dispose the center of the light emitting surface 31b in the cross section perpendicular to the longitudinal direction (X direction) thereof and the optical axis CL of the lens array in the cross section perpendicular to the arrangement direction (X direction) of each lens surface so as to be closer to each other.

In addition, since the portion of the light guide 31 which faces the lens unit 4 is chamfered along the light emitting surface 31b in the longitudinal direction, the center of the light emitting surface 31b in the cross section perpendicular to the longitudinal direction and the optical axis CL of the lens unit 4 in the cross section perpendicular to the arrangement direction of each lens surface are disposed so as to be closer to each other, thereby allowing the position closer to the top surface in which the plurality of through holes of the lens unit 4 on the optical axis CL are formed to be illuminated using the illumination unit 3 in the form of a band. In addition, the light emitting surface 31b of the light guide 31 and the incidence surface of the lens unit 4 are disposed close to each other, thereby allowing the CIS module to be made small.

In addition, since the portion of the case body 41 accommodating the lens array which faces the light guide 31 is chamfered along the arrangement direction of the lens surface, it is possible to dispose the center of the light emitting surface 31b in the cross section perpendicular to the longitudinal direction of the light guide 31 and the optical axis CL of the lens unit 4 in the cross section perpendicular to the arrangement direction of each lens surface so as to be closer to each other.

In addition, it is possible to condense the light reflected by the reflecting surface 31a inside the transparent member forming the light guide 31 toward the light emitting surface 31b with higher efficiency by totally reflecting the light by the scattering surface of the light shielding film 33 with higher efficiency. Further, it is possible to prevent the light of the LED which is incident on the light guide 31 from leaking to the outside from the outer circumferential surface of the light guide 31 using the light shielding film 33. In addition, in the related art, the light guide 31 is accommodated in a case and is provided in the frame 2 in order to prevent the leakage of the light, but as described above, the light guide 31 is covered by the light shielding film 33 that is extremely thinner than the case so as to prevent the leakage of the light, and thus the light guide 31 and the lens unit 4 can be disposed so as to be closer to each other.

Meanwhile, the invention is not limited to the above-described embodiment, and various modifications thereof can be made without departing from the scope of the invention. For example, the manner of the chamfering performed on the light guide 31 or the lens unit 4 is not limited to the above-described examples. As long as the lens unit 4 fitted into the concave groove 23 can be reliably pressed by the light guide 31 inserted into the inclined groove 22, the chamfering may be performed on the light guide 31 or the lens unit 4 in any of various ways. In addition, as long as the lens unit 4 can be pressed against the concave groove 23 by the light guide 31, there is no need to necessarily perform the chamfering on the light guide 31 or the lens unit 4. However, it is preferable to perform the chamfering on the light guide 31 or the lens unit 4 so that the optical axis CL of the lens unit 4 is appropriately irradiated with the light emitted from the light emitting surface 31b of the light guide 31 by disposing the light guide 31 and the lens unit 4 so as to be close to each other.

In addition, as long as the erect equal-magnification image can be appropriately formed on the sensor 5, the lens unit 4 (image forming optical device) may be configured in any way, and it is possible to employ a lens array in which a row of lenses is arranged, a lens array in which a plurality of rows of lenses are arranged, or the like. Further, it is possible to employ an image forming optical device in which aperture members are respectively disposed on the incidence side and the emission side of a lens array, an image forming optical device in which a plurality of lens arrays are arranged in an optical axis direction and aperture members are respectively disposed on the incidence side, between the lens arrays, and on the emission side, or the like. In addition, an image forming optical device may be configured by an SLA (SELFOC (registered trademark) lens array).

In addition, in the above-described embodiment, although the pressing members 25 are integrally molded in the frame 2 using the pressing member forming dies 203, the pressing members 25 may be formed in the frame 2 by protrusively disposing dies each having the same tip surface shape as the pressing surface of the pressing member 25 in the upper surface of the lower mold 202 instead of the pressing member forming dies 203.

In addition, the cross section perpendicular to the longitudinal direction of the light guide 31 is not limited to the above-described hexagonal shape, and may have any of various shapes such as a trapezoidal shape, a rectangular shape, or a pentagonal shape.

The invention can be widely applied to an image reading device including an image forming optical device that forms an erect equal-magnification image by forming an image of reflected light from an object to be read.

What is claimed is:

1. An image reading device comprising:
   an illumination unit that has a light guide body guiding light from a light source to an object to be read and illuminates the object;
   an image forming optical device that is disposed parallel to the light guide body, has a lens array provided with an incidence surface in which a plurality of lens surfaces are arranged in the same direction as a longitudinal direction of the light guide body, and condenses reflected light from the object which is incident on the incidence surface, thereby forming an erect equal-magnification image on a sensor; and
   a holding unit that holds the light guide body and the image forming optical device,
   wherein the held light guide body is disposed so as to partially overlap with the held image forming optical device, and regulates the separation of the image forming optical device from the holding unit by the light guide body.

2. The image reading device according to claim 1, wherein the holding unit includes a frame member and a partition member that partitions an internal space of the frame member into a first space and a second space, wherein the light guide body and the image forming optical device are held on the first space side of the partition member,
   wherein the sensor is disposed at a position facing the image forming optical device in the second space, and
   wherein a slit through which light emitted from the image forming optical device passes is formed at a position at which the image forming optical device and the sensor face each other in the first space and the second space.

3. The image reading device according to claim 1, wherein the illumination unit further includes a light source substrate on which the light source is mounted,
   wherein the holding unit further includes an insertion hole into which the light guide body is inserted from one end side of a longitudinal direction of the holding unit, and
   wherein the light guide body is inserted from one end side of the insertion hole, and a mounting surface of the light source of the light source substrate is brought into contact with and is pressed against the one end side so as to retain the one end side by the light source substrate, to regulate the separation of the light guide body from the insertion hole and hold the light guide body in an insertion state.

4. The image reading device according to claim 3, wherein a biasing unit that biases the light guide body in a direction in which the light guide body is separated from the insertion hole is provided on the other end side of the insertion hole.

5. A method of manufacturing a housing for insertion of an image reading device that irradiates an object to be read with light from a light source by guiding the light by a light guide body and that reads an erect equal-magnification image formed by condensing reflected light from the object by an image forming optical device using a sensor, wherein the housing is formed with an insertion hole into which is inserted the light guide body and further formed with a concave groove into which is fitted the image forming optical device, which concave groove is disposed parallel to the insertion hole, on one side which is the first space side of a partition member that partitions an internal space of a frame member into a first space in which the light guide body and the image forming optical device are disposed and a second space in which the sensor is disposed, the method comprising:
   forming a molding space by disposing a first mold that forms one side of the partition member and a second mold that forms the other side of the partition member so as to face each other, and disposing a plurality of insertion hole forming dies in the form of a row in the molding space; and
   pouring a liquid serving as a material of the partition member into the molding space and hardening the liquid,
   wherein in the first mold, a plurality of first dies each having a first bottom forming surface that forms a part of the bottom of the insertion hole are disposed in the form of a row so as to protrude, and a second die that is disposed parallel to the first dies and that forms the concave groove is disposed so as to protrude, wherein each of the insertion hole forming dies includes a second bottom forming surface that forms a remaining part of the bottom of the insertion hole and a pressing surface forming surface that forms a pressing surface for pressing the light guide body, which is disposed so as to face the second bottom forming surface and is inserted into the insertion hole, against the bottom, and wherein the first dies and the insertion hole forming dies are alternately disposed so as to closely adhere to each other in the molding space.

6. An image reading device comprising:

an illumination unit that has a light guide body guiding light from a light source to an object to be read and illuminates the object;

an image forming optical device that is disposed parallel to the light guide body, has a tapered surface, and condenses reflected light from the object which is incident on an incidence surface, thereby forming an erect equal-magnification image on a sensor; and a holding unit that holds the light guide body and the image forming optical device, wherein the held light guide body is disposed so as to contact with the tapered surface of the held image forming optical device, and regulates the separation of the image forming optical device from the holding unit by the light guide body.

7. The image reading device according to claim 6, wherein the light guide body has a tapered surface that contacts the tapered surface of the held image forming optical device.

8. The image reading device according to claim 6, wherein the holding unit has a pressing member to press the light guide body to the image forming optical device.

9. The image reading device according to claim 6, wherein the holding unit includes a frame member and a partition member that partitions an internal space of the frame member into a first space and a second space, wherein the light guide body and the image forming optical device are held on the first space side of the partition member, wherein the sensor is disposed at a position facing the image forming optical device in the second space, and wherein a slit through which light emitted from the image forming optical device passes is formed at a position at which the image forming optical device and the sensor face each other in the first space and the second space.

10. The image reading device according to claim 6, wherein the illumination unit further includes a light source substrate on which the light source is mounted, wherein the holding unit further includes an insertion hole into which the light guide body is inserted from one end side of a longitudinal direction of the holding unit, and wherein the light guide body is inserted from one end side of the insertion hole, and a mounting surface of the light source of the light source substrate is brought into contact with and is pressed against the one end side so as to retain the one end side by the light source substrate, to regulate the separation of the light guide body from the insertion hole and hold the light guide body in an insertion state.

11. The image reading device according to claim 10, wherein a biasing unit that biases the light guide body in a direction in which the light guide body is separated from the insertion hole is provided on the other end side of the insertion hole.

12. An image reading device comprising:

an illumination unit that has a light guide body that has a tapered surface guiding light from a light source to an object to be read and illuminates the object;

an image forming optical device that is disposed parallel to the light guide body and condenses reflected light from the object which is incident on an incidence surface, thereby forming an erect equal-magnification image on a sensor; and a holding unit that holds the light guide body and the image forming optical device, wherein the held light guide body is disposed so that the tapered surface of the light guide body contacts with the held image forming optical device, and regulates the separation of the image forming optical device from the holding unit by the light guide body.

13. The image reading device according to claim 12, wherein the image forming optical device has a tapered surface that contacts the tapered surface of the held light guide body.

14. The image reading device according to claim 12, wherein the holding unit has a pressing member to press the light guide body to the image forming optical device.

15. The image reading device according to claim 12, wherein the holding unit includes a frame member and a partition member that partitions an internal space of the frame member into a first space and a second space, wherein the light guide body and the image forming optical device are held on the first space side of the partition member, wherein the sensor is disposed at a position facing the image forming optical device in the second space, and wherein a slit through which light emitted from the image forming optical device passes is formed at a position at which the image forming optical device and the sensor face each other in the first space and the second space.

16. The image reading device according to claim 12, wherein the illumination unit further includes a light source substrate on which the light source is mounted, wherein the holding unit further includes an insertion hole into which the light guide body is inserted from one end side of a longitudinal direction of the holding unit, and wherein the light guide body is inserted from one end side of the insertion hole, and a mounting surface of the light source of the light source substrate is brought into contact with and is pressed against the one end side so as to retain the one end side by the light source substrate, to regulate the separation of the light guide body from the insertion hole and hold the light guide body in an insertion state.

17. The image reading device according to claim 16, wherein a biasing unit that biases the light guide body in a direction in which the light guide body is separated from the insertion hole is provided on the other end side of the insertion hole.

* * * * *